United States Patent [19]
Kirk et al.

[11] Patent Number: 5,841,026
[45] Date of Patent: Nov. 24, 1998

[54] AUTOMATIC TRANSFERENCE BETWEEN REAL-TIME OPERATION AND POST-PROCESSING IN A GPS SURVEY SYSTEM

[75] Inventors: Geoffrey R. Kirk, San Francisco; Michael Timo Allison, Santa Clara, both of Calif.; Ian Viney, St. Martins, New Zealand; Paul N. Skoog, Fremont, Calif.

[73] Assignee: Trimble Navigation Limited, Sunnyvale, Calif.

[21] Appl. No.: 647,701

[22] Filed: May 15, 1996

[51] Int. Cl.$^6$ .................................................. G01C 21/00
[52] U.S. Cl. ........................................ 73/178 R; 342/358
[58] Field of Search .......................... 73/178 R; 342/352, 342/357, 358

[56] References Cited

U.S. PATENT DOCUMENTS

| | | | |
|---|---|---|---|
| 4,912,475 | 3/1990 | Counselman, III | 342/352 |
| 5,359,332 | 10/1994 | Allison et al. | 342/357 |
| 5,502,641 | 3/1996 | Isomura | 342/357 |
| 5,523,763 | 6/1996 | Lommis | 342/357 |
| 5,563,607 | 10/1996 | Lommis et al. | 342/357 |
| 5,602,741 | 2/1997 | Talnot et al. | 342/357 |
| 5,610,614 | 3/1997 | Talbot et al. | 342/357 |

*Primary Examiner*—Max H. Noori
*Attorney, Agent, or Firm*—Thomas E. Schatzel; Law Offices of Thomas E. Schatzel A Prof. Corporation

[57] ABSTRACT

A centimeter level survey system includes reference base station and rover GPS units connected by a radio data link. Each includes recorders for the storage of raw measurement information including range, phase, cycle counts and time information. The rover unit is typically moved to points of interest during a survey while the base remains over a fixed, and known location. Generally, the base antenna is located to optimize a clear view of the sky. The rover is subject to interruption of the radio data link from the primary reference station. During periods that the rover is initialized and in contact with the primary reference station base station over the radio data link, the rover provides real time centimeter level position solutions to a survey user, otherwise, the rover records its raw measurements in a file that begins with the last valid initialization information and that ends with any newly reestablished initialization information. A post-processor is initialized by transferring the position filter states and covariance matrix of the real-time processor in the rover directly to the position filter of the post-processor, provided that continuous satellite tracking and no carrier cycle slips have occurred.

20 Claims, 3 Drawing Sheets

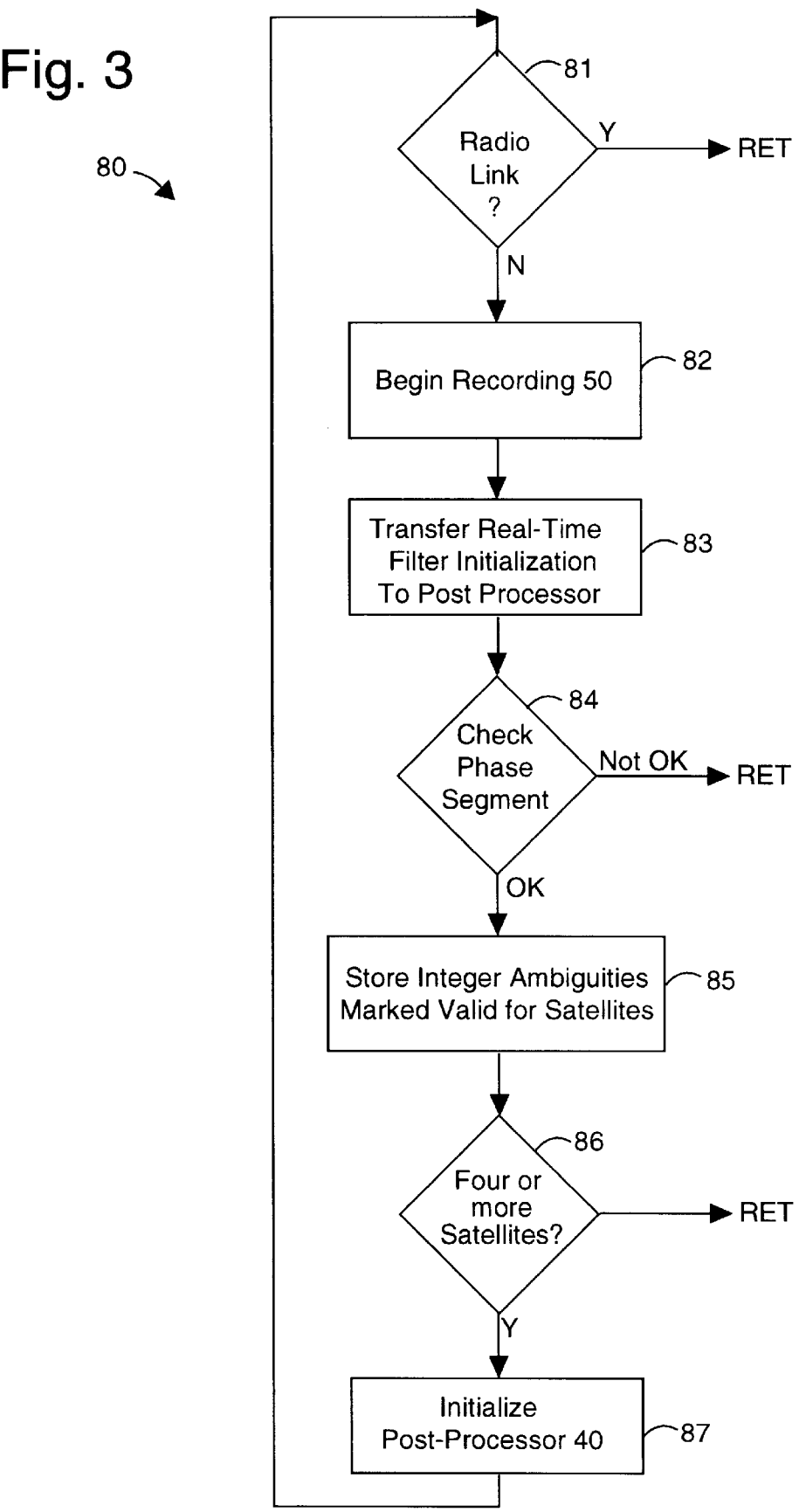

AUTOMATIC TRANSFERENCE BETWEEN REAL-TIME OPERATION AND POST-PROCESSING IN A GPS SURVEY SYSTEM

BACKGROUND OF THE PRESENT INVENTION

1. Field of the Present Invention

The present invention relates generally to centimeter-level survey instruments based on navigation satellite receiver systems and more specifically to easy to use systems that automatically bridge periods of communications link loss between a reference station and a survey rover.

2. Description of the Prior Art

Centimeter-accurate global positioning system (GPS) navigation depends on being able to resolve individual cycles of carrier phase from an orbiting satellite to a navigation receiver. The many cycles of phase that could be in the neighborhood of a code-based position solution create an ambiguity that is difficult, but not impossible to resolve. The integer number of cycles to each of several satellites simultaneously indicates the correct unique integer-ambiguity solution.

Real-time kinematic (RTK) surveying is a valuable branch in the science of GPS positioning. RTK has substantially improved surveying productivity in the field. RTK eliminates the time consuming post-processing of satellite data that had been an inescapable part of conventional kinematic and static GPS surveying. Quality assurance indicators are produced in real-time that guarantee the results will be good before vacating a site. In the past, cycle slips and other problems, especially at the reference GPS receiver, prevented post-processing the kinematic data and such problems were latent and ruinous. With RTK, this and other blunders in field procedures are detectable and thus costly re-surveys can be avoided.

Although RTK systems, such as those from Trimble Navigation (Sunnyvale, CA), have been commercially available for some time, some of these products require static initialization for carrier integer ambiguity resolution. The maximum benefits of RTK are only realized when such initialization processes are independent of system motion, are fully automatic and are transparent to the user/surveyor.

The performance of RTK systems is often judged by the reliability of initialization and the time it takes a receiver to initialize, both of which are interrelated. The time it takes a receiver to initialize is defined here as the time needed to produce the first centimeter-level accurate output, e.g., after a complete loss of lock on all satellites. In real-time five or more satellites are required to be visible, or a minimum of four in post-processing are needed, in order to rely on highly efficient integer search strategies. The accuracy of the centimeter-level output of a RTK system is a key element of the system performance.

Up until a few years ago, commercial RTK systems for land surveying were simply not available. However, GPS systems for navigation and positioning were already a well-established industry standard for a variety of geodetic survey applications. Surveyors using GPS systems relied on traditional post-processing with data collection times that could range up to an hour. A method called FAST STATIC™ data collection reduced this to a few minutes. Post-processed kinematic was effective, but was risky without good satellite visibility, especially without knowledge of satellite tracking at the base receiver.

The ability to perform surveys in real-time has many benefits across a variety of applications. Real-time communications between the reference and multiple rover stations provides integrity checking. Users are able to navigate to survey marks very accurately. But static RTK systems require the user to suffer an initialization procedure while the receiver remains stationary when first used in the field.

During initialization, the conventional GPS surveyors require occupation of a known survey mark or the location of two antennas approximately at the same place using an initializer plate. These constrain the field procedure, and can cause problems when the satellite signals become obstructed, e.g., when a user passes under a bridge. In such a case the user would be forced to return to a known point, or reinitialize the survey in some other manner.

Fully automatic ambiguity resolution (FAAR), as commercially developed by Trimble Navigation, avoids having to initialize from a known mark. A stationary base unit provides reference signals to a "rover" unit that moves about to conduct a survey. There is no constraint on the rover during initialization, it may be stationary or moving. This process has two performance parameters associated with it, the initialization reliability and the time to initialize. Both initialization time and initialization reliability are key criteria for a commercial user of a real-time kinematic system.

The radio link between the primary reference station and the rover is critical to real time processing. Such radio links typically operate on the 900 MHz band using spread spectrum modulation. In a typical survey, the rover can be separated by six or more miles. Such separations can make the radio link unreliable. Short outages, e.g., a loss of one or two seconds, are not fatal. But longer outages, e.g., five seconds or more, can prohibit the computation of centimeter level positions at the rover. In the worst case, the rover will lose its RTK initialization and have to collect data long enough to reestablish initialization. A rule of thumb for post-processing says this will take one minute for each mile the primary reference station and rover are separated. RTK does much better. Therefore, inadvertent losses of the radio link can prevent measurement taking and thus idle the survey crew.

Post processed survey systems do not need the radio link between a reference station and a rover, because all the data from each is recorded. The two parts are then combined in the office to compute the centimeter level positions of the rover at particular times. But such recording takes tremendous amounts of storage, and survey errors are not discoverable in real time.

SUMMARY OF THE PRESENT INVENTION

It is therefore an object of the present invention to provide a survey system that provides real time processing at every opportunity and automatically and seamlessly reverts to post process recording when real time solutions are stumbling or prevented.

Another object of the present invention is to provide a method for the initialization of post-processors such that positions can be computed for periods of time when a real-time radio link is not available.

It is a further object of the present invention to provide a survey system that provides initialization data in a post processing record for backward propagation in the record for centimeter level position recovery at times preceding the initialization data.

Briefly, a centimeter level survey system includes reference base station and rover CPS units connected by a radio data link. Each includes recorders for the storage of raw measurement information including range, phase, cycle counts and time information. The rover unit is typically moved to points of interest during a survey while the base remains over a fixed, and known location. Generally, the base antenna is located to optimize a clear view of the sky. The rover is subject to interruption of the radio data link from the primary reference station. During periods that the rover is initialized and in contact with the reference base station over the radio data link, the rover provides real time centimeter level position solutions to a survey user. During periods that the rover is not initialized or not in contact with the reference base station over the radio data link, the rover records its raw measurements in a file that begins with the previous initialization information and that ends with any newly reestablished initialization information. A post processor then combines the recordings from each of the reference base station and the rover to recover survey position solutions for periods that the rover was not initialized or was not in contact with the reference base station over the radio data link.

It is an advantage of the present invention that a survey system is provided that is automatic and does not require intervention by the user during periods when the rover is not initialized or not in contact with the reference base station over the radio data link.

Another advantage of the present invention is a method is provided that allows the data storage capacity in rover receiver to be more modest. Only the GPS data and satellite observables need to be stored when the radio link is not available or the rover is not initialized. This contributes to the portability of the rover unit and its small size and low-power requirement.

It is a further advantage of the present invention that a survey system is provided that generates relatively small files for any necessary post processing.

These and other objects and advantages of the present invention will no doubt become obvious to those of ordinary skill in the art after having read the following detailed description of the preferred embodiment which is illustrated in the drawing figures.

IN THE DRAWINGS

FIG. 3 is a flowchart of a measurement domain method used to initialize the post-processor of the survey system of FIG. 1.

DETAILED DESCRIPTION OF THE PREFERRED EMBODIMENT

Figure 1:
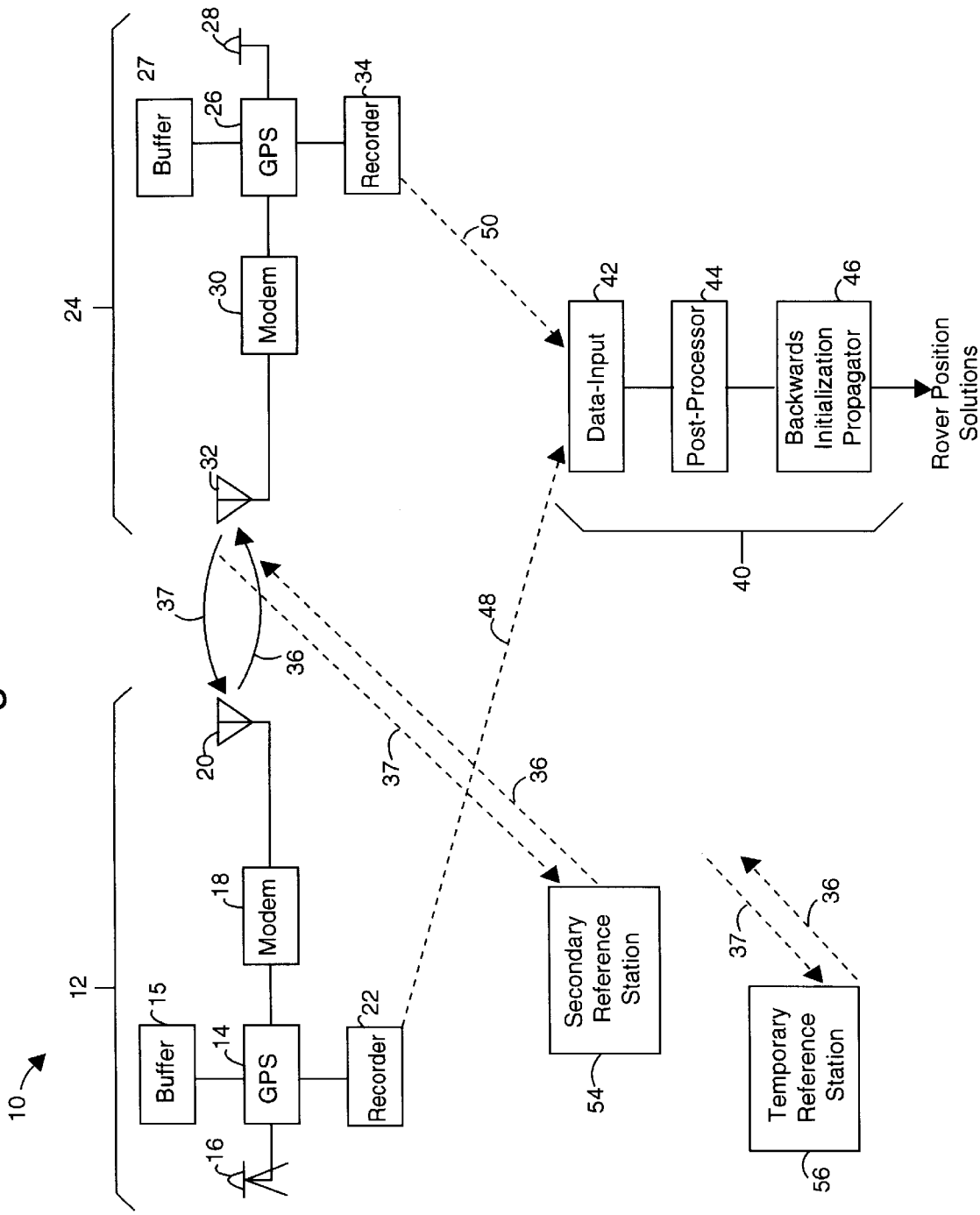
FIG. 1 is a block diagram of a survey system embodiment of the present invention.

FIG. 1 illustrates a survey system embodiment of the present invention, referred to by the general reference numeral 10. A real-time kinematic (RTK) base reference station 12 includes a GPS receiver 14 with a data buffer 15 and a lightweight antenna 16, a radio-modem 18 with a radio antenna 20, and a recorder 22. For example, the antenna 16 may be a tripod-mounted type and the modem 18 and antenna 20 can use the UHF radio frequencies. The RTK reference station 12 is preferably situated at a known location and its satellite measurements are sent to a survey rover 24. The roving unit 24 includes a GPS real-time processor and receiver 26 with a data buffer 27, a GPS antenna 28, a radio-modem 30, a radio antenna 32 and a recorder 34. The recorders 22 and 34 may comprise removable hard disk drives, e.g., industry standard "PCMCIA" type plug-in modules or solid state memory. The radio antenna 32 can be mounted on the frame of a surveyor's backpack. The roving unit 24 is meant to be carried by one person, e.g., six miles or more from the RTK base station 12.

A reference-to-rover radio data link 36 and, alternatively, a rover-to-reference radio data link 37 are established between the primary reference station 12 and the survey rover 24, e.g., on 900 MHz and using spread spectrum modulation. It may be advisable in particular applications to deliberately use different radio services and modulation methods for each of links 36 and 37 to make the overall communication system more robust.

Preferably, low-power GPS receivers are used for receivers 14 and 26 to provide for many hours of surveying, e.g., using standard camcorder batteries. Additional radio-modems, e.g., TRIMTALK# units by Trimble Navigation (Sunnyvale, Calif.), can be used as repeaters to allow coverage of a large or obstructed area. Thus, line-of-sight is not required between the base 12 and rover 24.

A post-processing system 40 is conveniently located back at a shop or surveyor's office and comprises a data input 42, a post processor 44 and a backwards initialization propagation unit 46 integrated within. A pair of recordings 48 and 50 are respectively communicated by wire or wireless means, or carried as data disks or tapes from the primary reference station 12 and the survey rover 24, to the post-processing system 40.

In alternative system embodiments of the present invention, a secondary reference station 54 and a temporary reference station 56 are included in system 10. Each are similar to the reference station 12 and communicate with links 36 and 37. Additional information that may be helpful in constructing embodiments of the present invention may be found in U.S. patent application Ser. No. 8/367,051 filed Dec. 29, 1994. Such application is incorporated herein by reference.

Figure 2:
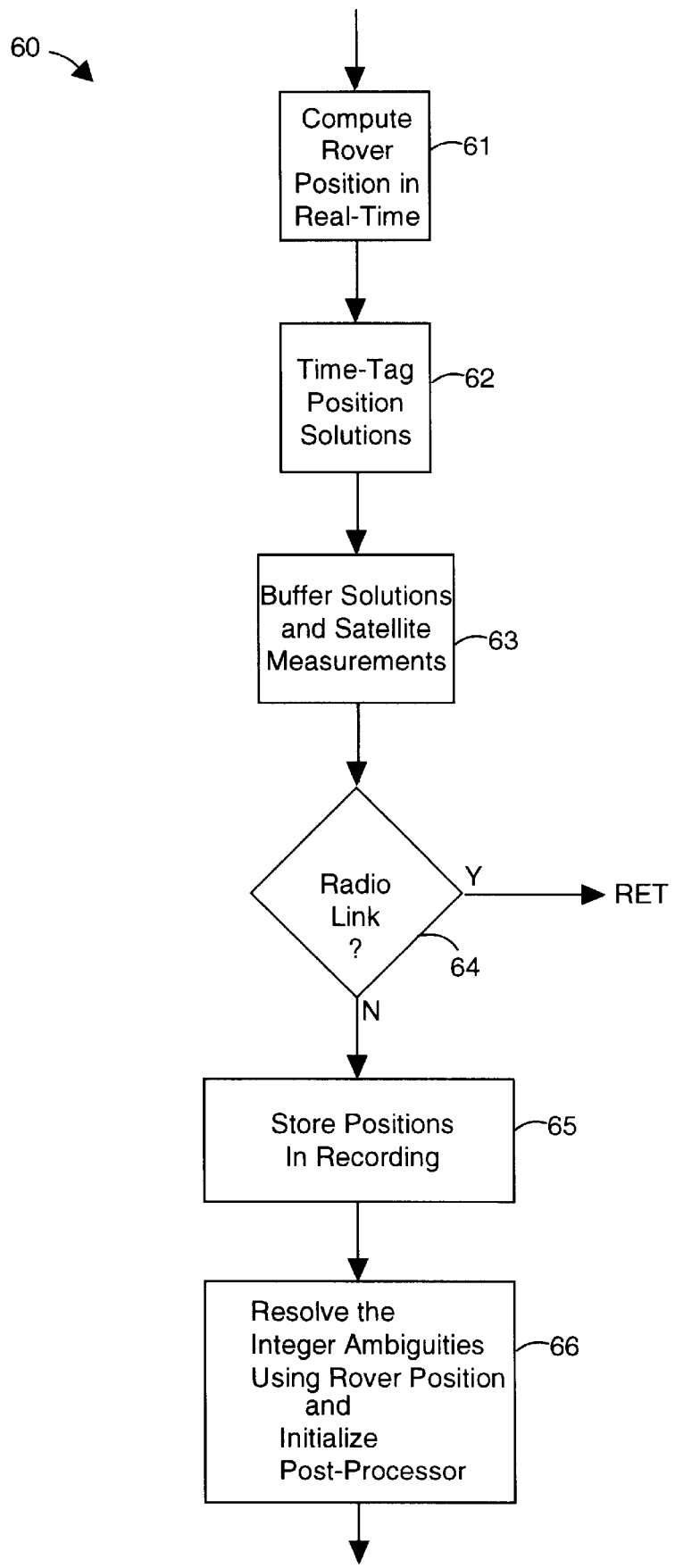
FIG. 2 is a flowchart of a position domain method used to initialize the post-processor of the survey system of FIG. 1.

FIG. 2 is a flowchart of a position domain method 60 used to initialize the post-processor 44 of the survey system of FIG. 1. A step 61 computes the position of rover 24 in real-time. A step 62 time-tags each of these position solutions, e.g., using numbered GPS epoch periods. A step 63 buffers a number of position solutions and associated GPS satellite measurements for time-tag alignment with other data later. A step 64 checks the radio link 36. If the radio link is broken, a step 65 stores the position solutions in the recording 50. A step 66 resolves the integer ambiguities using the rover position, which thus initializes the post-processor 44, e.g., similar to the conventional method of initializing a kinematic survey from a known baseline.

FIG. 3 is a flowchart of a measurement domain method 80 used to initialize the post-processor 44 of the survey system of FIG. 1. A step 81 checks to see if the radio link 36 has been interrupted. If the radio link is not present, a step 82 begins recording 50. Such recording preferably includes GPS data and the integer ambiguities from the position filter of the real-time processor 26 in the rover 24. Such will be used to directly initialize the position filter in the post-processor 44 in the post-processing system 40. The GPS data and the integer ambiguities are transferred to the post-processor 44 in a step 83. A step 84 checks to see if the involved GPS satellites have been continuously tracked and that no cycle slips have occurred. If all right, a step 85 stores the GPS data and the integer ambiguities in the post-processor 44 for each associated satellite. A step 86 checks to see if four or more satellites have thus been marked as providing valid data. If so, a step 87 initializes the post-processor 44 directly by starting with the position filter states which include the integer ambiguities and the covariance matrix supplied by the real-time processor 26. Post-processed positions are thus made available from the post-processing system 40.

In the position domain method 60, the difference in carrier cycles between a GPS satellite and a reference GPS satellite and each of the primary reference station 12 and the survey rover 24 are computed. When each settles on the respective cycle counts, the GPS receiver is said to be initialized and the rover 24 is capable of computing its position to the centimeter level by virtue of its initialization and the differential correction information provided by the primary reference station 12 over the radio data link 36. Centimeter level position solutions are prevented when the survey rover 24 loses its initialization or loses contact with the primary reference station 12.

The following gives details of the methods used to initialize the real-time processor, which are required prior to the methods used to transfer initialization to the post-processor, as depicted in FIGS. 2 and 3. Phase measurements are inherently ambiguous by an integer number of carrier wavelengths. Determining such integers in real-time, e.g., resolving the integer ambiguities, is fundamental to initializing RTK, and can be done in a variety of ways. Re-initialization is required whenever a continuous lock on four or more satellites is lost. Prior art single-frequency GPS surveying equipment requires occupation of a known survey mark or use of an initializer plate. Nevertheless, such L1-only systems provide most of the important productivity benefits of RTK, albeit while using less expensive receiver technology. When such inexpensive systems are used in open areas where the satellite visibility is good, the field productivity approaches that of the more costly dual-frequency technology.

The Trimble Navigation GPS TOTAL STATION™ and other similar commercial products support such static initialization methods. The Trimble Navigation GPS TOTAL STATION™ also supports fully automatic ambiguity resolution, which is effective when the rover is static or moving. Initialization while moving is called on-the-fly (OTF), e.g., RTK-OTF. In both static and moving initialization the methods are similar, and each relies on high quality dual-frequency observables from the GPS receivers. L1 and L2 pseudoranges and full-cycle L1 and L2 carrier phase measurements are made available. When there is an encryption of the precision code signal, the L2 pseudorange is simulated. Low power operation is essential for field operation, and commercially available integrated circuit technology can be employed, e.g., the MAXWELL signal processing technology developed by Trimble Navigation.

Reliable and fast automatic initialization requires a minimum of five satellites, and can be thereafter maintained with four satellites. Conventional GPS post-processed survey methods include collecting information over time frames that are long enough to observe a significant change in satellite geometry, and therefore make do with fewer satellites.

The GPS real-time processor 26 initializes in several steps. First, the integer ambiguities are estimated by forming float ambiguities from combined pseudorange and carrier phase. This enables a differential float-ambiguity solution. Then these estimates are filtered separately, or part of a position filter to reduce the effects of measurement noise. An integer search is next conducted to identify the correct set of integer ambiguities. The RTK solution is initialized and the differential fixed-ambiguity position solution is enabled. Lastly, the correct initialization is verified prior to storing survey quality positions.

When four satellites become visible, differential positioning can begin using a float-ambiguity solution. The accuracy of this is limited by the pseudorange noise which is dominated by local multipath. Sub-meter performance is typical and similar to differential positioning using RTCM differential beacon methods. Ambiguity resolution also can start, but an integer search will not be invoked until sufficient filtering occurs with four or more satellites visible at both the primary reference station and rover.

The integer search is bolstered by a surplus of satellites. By using highly-optimized search methods, the use of a math coprocessor is not necessary to reduce the search computation time. All the kinematic baseline processing can be completed by the rover GPS real-time processor 26, and this helps reduce overall power consumption. Such hardware minimization is a priority for field portable equipment.

Following the integer search, the whole system 10 is preliminarily initialized and fixed-ambiguity centimeter-level positioning begins. Although the ambiguities are typically resolved with high confidence, a further integer verification step is usually necessary before allowing a survey to begin. This increases the probability of correct initialization to an acceptable level.

Once initialized, a subsequent loss of initialization and search is considerably enhanced when two or more satellites have managed to be continuously tracked. One or two surviving double-differenced integers bridge over the loss of initialization. This then significantly reduces the number of potential integer combinations and speeds a final integer solution. Such a situation is more the norm than a complete loss of tracking of all the satellites.

Initialization integrity relates to the confidence with which the carrier integers are resolved. In other words, the confidence level that correct initialization was obtained. When L1 and L2 observables are combined, practically instantaneous initialization can be achieved. However, this is of little interest to the surveyor unless it is the usual case for the many varied field environments, e.g., multipath, tropospheric and ionospheric effects, poor satellite visibility, geometry, etc., and with a very high initialization success rate.

When static or at a survey mark, quality assurance indicators can optionally be recorded to ensure that the occupation time was sufficient to meet survey accuracy requirements selected by the surveyor. Covariance matrices are stored along with the positions for post-mission network adjustment. As a last line of defense, every position solution is associated with a unique initialization segment. Information pertaining to this segment can be stored within the receiver 26, or wherever else convenient.

An ambiguity search is at the heart of many RTK systems. The condition of the ambiguity search at any one point is very important to the overall operation of the post-processor 44. The number of fixed/float integer ambiguities is recorded for L1/L2, or any combination, e.g., "wide-lane" or "narrow-lane" bands. Information appears at the serial port each epoch period that is related to the current state of the ambiguity search and may be recorded for diagnostic purposes, e.g., the search list, the total number of candidates scanned to generate the search list, the search window used to generate the search candidates, the number of candidates in the search list, the RMS figure of the best ambiguity candidate, the RMS ratio of the best candidate to the next best candidate, the number of degrees of freedom accumulated in the search, and the number of satellites used in the search. The double difference float ambiguity estimates for each satellite combination are also important. The fixed integer ambiguity values may also be recorded for each double-difference satellite combination that has been successfully resolved. Error information, such as slippage faults, may be recorded to a file for the post processing system 40.

Recording 48 does not have to be continuous, it can be turned-on automatically, e.g., by request from the rover 24 over link 37 or automatically in response to a lack of status information from the rover 24.

Table I lists a sequence of event times that relate to the maintenance of the communication link 36.

TABLE I

| | |
|---|---|
| t0 | system 10 powered on |
| t1 | rover 24 initialized |
| t2 | last computed position time tag |
| (t2 + m) | satellites tracked drop below four |
| t3 | radio link 36 lost |
| t3 + 1 | link loss detected |
| t4 | radio link 36 reestablished |
| (t5 − n) | satellites tracked increase to four or more |
| t5 | rover 24 re-initialized |

Due to a latency in transmitting RTK measurement corrections from a reference station, it is usual for a time-tag of the computed real-time position to refer to a time one or two epochs prior to the current epoch time, the actual time when the real-time position is computed. For example, in a system with an epoch measurement interval of one second, at a time t, a real-time position is computed which refers to the position of the rover station at time t−1, e.g., the position time-tag is t−1 seconds.

When a radio link is interrupted at a time t, for example, the last computed position has a time tag of t−1. The most recent GPS data measured at the rover 24 has a time tag of t. It is necessary to start recording the GPS data for the post-processor 44 at time t, but a position with time-tag t is not available. Thus a buffered scheme is required for initializing in the position domain.

A continuation of the recording 50 after any re-establishment of the data link 36 is necessary for seamless post processing. At time t3, the time-tag of the GPS data given by the recording 50 is t3. However, the time-tag of the real-time position given by radio data link 36 is t3−x=t2, depending on the radio link latency x in time, for example t3−1. It is therefore preferable to store the GPS data beginning from time t2 and continuing thereafter. The buffer 27 is used to store data between times t2 and t3. The greater the link latency, the larger the value of x, in seconds, and thus the larger the difference t3−t2.

The buffer 27 uses the time-tags of both the real-time positions and the GPS data. A less common scenario can be described by the inclusion of events at times t2+m and t5−n. During the period between t2+m and t5−n, e.g., bounded by epochs when less than four satellites are being tracked, positions can still be computed by the post-processor 44, provided that post-processor 44 can be independently initialized. This requires periods between t2+m and t5−n with a minimum of four tracked satellites.

FIG. 2 illustrates a position domain method 60 for initialization of integer ambiguities. At a time t0, the system 10 is first turned on. Raw measurement information and/or differential correction data begins to be communicated to the rover 24. At a time t1, the survey rover 24 has collected enough information to become initialized. Between time t0 and t1, prior to real-time initialization, the positions can be computed using post-processed data. ordinarily, this period of productivity could be lost. By recording the information collected from the GPS satellite, the real-time survey position solutions can be reconstructed.

The recording 50 anticipates a loss of communication by constantly recording such data in a circular buffer that is transferred as a history to the recording 50 at time t3. Real time survey position solutions are not available after time t3 from rover 24, because data is not available from the reference 12. At a time t4, the radio data link 36 is reestablished. The recording 50 continues until a time t5 when the survey rover 24 initialization can be reestablished in real-time. A loss of radio link 36 does not cause the GPS real-time processor 26 to become uninitialized, as long as four or more satellites are being continuously tracked. Information about the reestablished information is copied into the recording 50 at time t5 and the recording 50 is ended. Raw satellite measurement information, e.g., range, phase, cycle count and time measurements are recorded by the survey rover 24 in the recording 50 between times t2 and t5.

If, the rover GPS real-time processor 26 loses initialization when the radio link 36 is down, the storing of new initialization information, e.g., the rover position at t5, allows backwards processing from t5 to a point t5−n, that is between t3 and t5 when post-processed initialization will be lost, e.g., a point when less than four satellites are tracked.

Should events t2+m and t5−n occur, post-processed positions using the initialization information provided by the GPS real-time processor 26 can only be computed forwards between times t2 and t2+m, and backwards, between times t5 and t5−n. At time t2+m the number of continuously tracked satellites is less than four. At time t5−n the number of tracked satellites reaches four, and remains continuously at four or more until t5.

The initialization information recorded by the survey rover 24, with time t2 at the beginning of the file 50, is used by the post processing system 40 to compute centimeter level survey position solutions for the rover 24 between times t3 and t5.

Alternatively, initialization information recorded by the survey rover 24 at time t5 at the end of the file 50 can be backward propagated in time by the propagation unit 46 to be used by the post processor 44 to compute centimeter level survey position solutions for the rover 24 between times t3 and t5. Either way, such computations are, of course, not done in real time. The beginning and ending initialization information may also be cross compared to check the validity and improve solution confidence levels.

The systems described here may continue their logging with recordings 48 and 50 after system initialization, e.g., to increase the confidence level of the eventual transference.

The real time survey position solutions of the survey rover 24 that would otherwise have coverage gaps are seamlessly and automatically filled in by the brief, but focused, post-processing by the post-processing system 40.

The present invention does not require that the logging system be a part of the RTK base system. The logging system may be associated with any other part of the whole. Although one base station associated with one rover unit has been described here, the present invention includes the use of any number of base stations associated with any number of rover units.

The method 60 initializes the post-processor 44 using information in the position domain. The rover receiver position is computed in real-time and stored. The position is used to resolve the integer ambiguities within the post-processor 44. The process is similar to the conventional process of initializing a kinematic survey from a known baseline.

The position is a non-static variable, e.g., it changes at each measurement epoch. For this reason, when starting to store GPS data for post-processing, a position from the real-time processing must also be available for storage with a time-tag that corresponds with the first stored epoch of GPS data.

A circular buffer has been described in connection with the system 10. It is preferable that something less complicated for the software should be used instead. A circular buffer may be used to store data between times t2 and t3, but such is not required between times t4 and t5, so conventional data storage can be used. The use of buffers complicates the software, which must also allocate memory for the buffers.

The measurement domain method is preferred over the position domain method 60, since the quality of the position fix may be adversely affected by the prevailing satellite geometry, e.g., the position dilution of precision (PDOP). If the PDOP is very high, it may not be possible to reliably initialize the post-processor 44 using a position fix computed in real-time.

The measurements made by the GPS receivers can themselves provide the integer ambiguities. The integer ambiguities are static variables, compared with the non-static nature of position. Once a satellite signal is acquired, the integer ambiguity remains constant until there is a cycle-slip or loss of signal lock.

Initializing with the measurement domain method 80 makes a circular buffer unnecessary. An overlap between real-time position fixes and stored GPS data is not required. Also, the initialization of the post-processor 44 is more reliable.

The measurement domain method 80 works independently of satellite geometry, and initialization computation is reduced. The integer ambiguities are simply transferred from the GPS real-time processor 26 to the post-processor 44. The initialization of the post-processor 44 cannot fail if the GPS real-time processor 26 was correctly initialized.

The collection of GPS data by recording 50 is not necessary in the method 80 between times t2 and t3. At time t3, the last position fix is computed in real-time prior to a radio link outage between t3 and t4. Such outages cannot be predicted in real systems, and the outage is not detected until time t3+1, assuming a one second epoch interval. At such time t3+1, no position fix is computed, and data recording 50 preferably is begun. The last computed position has a time-tag of t2 seconds, and cannot be used to initialize the post-processor 44 using the position domain method 60. At the first epoch of data recording 50, at time t3+1, the integer ambiguities from the GPS real-time processor 26 are stored together with the GPS data to be used for the direct initialization of the post-processor 44.

It is critical that the integer ambiguities computed by the GPS real-time processor 26 at time t3, but which have an identical time-tag as the position fix of t2, must still be valid at time t3+1 when they are stored. For each individual satellite, this will be true if the satellites involved are being tracked continuously between times t2 and t3+1. A continuous phase-segment counter is preferably used to guarantee this continuous tracking requirement for each satellite. Such counters are incremented each time a satellite has a cycle-slip or experiences a period of a loss of lock.

The integer ambiguities are associated with values of the segment counters. Prior to storing the integer ambiguities at time t3+1, the current segment counters for the CPS data collected at time t3+1 are compared against recorded segment-counter values that were associated with the integer ambiguities for the GPS data used by the CPS real-time processor 26 at time t2. If the segment counters match, the integer ambiguity for the corresponding satellite is marked as valid for notice by the post-processor 44. However, the post-processor 44 must check that continuous tracking was maintained at the reference receiver 14 between times t2 and t3+1, e.g., by checking each of the cycle-slip flags stored in the recorded GPS data at the reference.

Integer ambiguities are, in reality, double-difference integer ambiguities that relate to ambiguities from two satellites. Thus, at least two satellites must be continuously tracked to provide one or more integer ambiguities. To initialize the post-processor 44, three or more integer ambiguities need to be generated, so four or more satellites must be tracked. In general, each satellite can be assumed to provide a corresponding integer ambiguity, insofar as double-differencing is concerned. So all the satellites provide an integer, with a reference satellite having an integer of zero that is a component in each double-difference.

The measurement domain method 80 resembles the position domain method 60 for the period in which the radio link 36 is unavailable and then is reestablished. CPS data is stored by recording 50 until time t5. At time t5, the CPS real-time processor 26 in the rover 24 becomes initialized, and can produce a position with a time-tag of t5−x. Thus, CPS data stored with time-tags between t5−x and t5 are redundant, but this is of no consequence.

However, the position measurement method 60 assumes that the reference unit 12 continues to collect data throughout a survey. Epoch intervals of one second, or less, may be required for certain kinematic survey applications, e.g., continuous kinematic for contouring. Thus, the reference receiver 14 would require a large data storage memory capacity.

Alternative embodiments of the present invention make use of the radio link 37 from the rover 24 to the reference 12. When the radio link 36 from the primary reference station 12 to the rover 24 becomes unavailable, a message is preferably sent from the rover 24 to the primary reference station 12 to start GPS data recording. The radio link 37 is preferably of a different nature, e.g., one which is not affected by the same problem afflicting the link 36. In an alternative embodiment, an immediate response from the rover 24 is not required. Responses with the rover-to-reference communication link 37 can be reserved for when the reference-to-rover communication link 36 reestablishes.

The link 36 from the reference 12 to the rover 24 must have enough bandwidth to carry measurement corrections, whereas the link 37 back from the rover 24 to the primary reference station 12 can have a very narrow bandwidth. A single data recording switch in the GPS reference station receiver 14 is all that must be communicated. The radio link 37 may use a difference frequency, and even a different modulation scheme.

A further improvement can be made by allowing the rover 24 to communicate with the secondary reference receiver 54 which has the sole purpose of collecting GPS data for post-processing. A clear radio communication to this reference and knowledge of its position is required.

Another improvement can be made by having the temporary secondary reference receiver 56 communicate with the rover 24. When the radio link 36 is lost, a temporary survey mark is made at any convenient place, and the secondary reference receiver 56 is placed at this mark for GPS data collection.

Since the secondary reference receiver 56 can be local to the rover 24, data collection can be started manually without a communication link. The secondary reference receiver 56 must be established prior to a radio link 36 outage and position domain initialization must be used. The position of the secondary reference receiver 56 can be initially unknown, in which case it must be established later and provided to the post-processor 44. Either real-time, for example, when the radio link 36 becomes available, or post-processed GPS survey methods can be used to obtain the secondary reference receiver 56 position.

The initialization of the post-processor 44 can be made using either a measurement domain method 80 or a position domain method 60. The latter must be used when employing a secondary reference. For the position domain method 60, the size of the circular buffer 12 must be sufficient to account for any addition latency caused by the communication channel between the rover 24 and reference station 12, to be able to start the GPS data recording at the primary reference station 12.

Referring to FIG. 3, the measurement domain method 80 begins data logging at the rover 24 at t3+1+Δt, where Δt accounts for the latency in starting the GPS data recording at the primary reference station 12 with a signal communicated over the rover-to-reference communication link 37. The post-processor 44 must check for continuous satellite tracking between the times t2 and t3+1+Δt at the primary reference station 12. Data collection is started by a command received from the user. The primary reference station 12 must maintain a buffer for cycle-slip information between times t2 and t3+1+Δt, e.g., for the last x+1+Δt epochs. When GPS data recording is started at the primary reference station 12 at time t3+1+Δt, flags are set for each satellite which maintained continuous lock between these specified times. These flags are used by the post-processor 44 to validate the integer ambiguities stored at the rover 24.

When a secondary reference station 54 is used with the position domain initialization method, the post-processor 44 initializes to the receiver in the secondary reference station 54. It then resolves integer ambiguities which relate to the GPS data for the rover 24 and secondary reference station 54. The rover positions are then computed relative to this reference. The position of the receiver of the secondary reference station 54 is known relative to the primary reference station 12, so the rover 24 positions are also accurate relative to the primary reference station 12.

It may not always be possible when the radio link 36 from the primary reference station 12 to the rover 24 is broken for the rover 24 to be able to communicate back to the primary reference station 12 or with a secondary reference station 54. The return communication link 37 may be prevented or impossible.

Each reference station 12, 54 or 56 preferably includes a GPS data buffer capable of storing data for T seconds, e.g., in a circular buffer. Every T seconds, the rover 24 communicates with the primary reference station 12, and sends a "link OK" message. This message indicates that during the last T seconds real-time positioning was possible without interruption and post-processing of GPS data is unnecessary.

When the radio link 36 is interrupted, the scheduled T-seconds report time will pass without a link-OK message. The reference stations detect that a report has not been received, saves the contents of the data buffer, and starts the recording of GPS data. When the radio link 36 is reestablished, the rover 24 sends a message that instructs the reference stations to save the contents of the data buffer and to start GPS data recording. Such is redundant if the scheduled report time has passed, because it would have been done automatically. When real-time positioning restarts at the rover 24, either as soon as the radio link 36 is reestablished or after the CPS real-time processor 26 has re-initialized, the rover 24 sends another message to the primary reference station 12 to stop CPS data recording. If the scheduled report time occurs prior to sending the stop-GPS-data-recording message, the usual link-OK message is not necessary.

The reference-rover communications preferably uses a hand-shaking protocol to ensure that the messages sent are actually received. The scheduled report times are easily synchronized at the reference 12 and the rover 24 since each have CPS time clocks available. The amount of data storage memory required at the primary reference station 12 is thereby reduced. Any additional data to be stored occurs only if the GPS real-time processor 26 must be re-initialized.

The GPS data collection at the rover 24 is similar to that described for the primary reference station 12 that continuously stores data throughout a survey.

The position domain and measurement domain initialization methods for the post-processor 44 are also useful when the CPS data collection at the primary reference station 12 is not continuous.

The GPS data collected at the primary reference station 12 and rover 24 during periods of radio outage are typically post-processed at some later time by the post-processing system 40. The GPS data is downloaded to a processor, e.g., a personal computer (PC), over a local RS232 link.

Alternatively, the GPS data stored at the primary reference station 12 can be broadcast to the rover 24, once the radio link 36 is reestablished, in conjunction with the data required for real-time positioning at the rover 24. Such data can be interleaved. At the rover 24, the GPS real-time processor 26 processes both the real-time data and back-processes the data stored during the radio link 36 outage. The advantage of this method is that all the rover 24 positions are computed and available in the field without the necessity to download GPS data from the receivers 14 and 26 and post-process in the office environment. Such helps to identify problems that might have occurred during post-processing and enables a surveyor to reoccupy survey points. For example, when less than four satellites are being tracked continuously at either reference or rover during the radio link 36 outage.

In general, the post-processor 44 is initialized using information from the GPS real-time processor 26. The position domain method 60 of initialization depends on non-static position information. The measurement domain method 80 depends on static integer ambiguity information. The post-processor 44 is started in an initialized state, e.g., where the integer ambiguities are directly resolved from the transferred information.

The GPS real-time processor 26 can pass all the information from its position filter to the post-processor 44. Such position filters usually comprise a multi-state Kalman filter, and the position filter need not be initialized. Therefore the integer ambiguities do not need to be known. The post-processor 44 can use this raw information to start its position filter in the most statistically optimum fashion, and produce the best quality positions. If the GPS real-time processor 26 is not initialized, such information can nevertheless reduce the time required for the post-processor 44 to initialize. The transferred information preferably includes the position filter states and state covariance matrix.

The initialization methods of the present invention are useful in many other non-RTK types of position computation, e.g., other double-differenced and non-differenced processing applications. For example, computing rover positions with correction information from the primary reference station receiver 14 that is transmitted in a conventional RTCM-104 format, e.g., differential CPS. The real-time or post-processors are not required to be initialized in the RTK sense where the integer ambiguities are known.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the present invention.

What is claimed is:

1. An improved survey system, including a reference base station for receiving signals from orbiting navigation satellites, a survey rover for computing a vector to the base station, a radio data link connected to provide measurement information from the primary reference station base station to the survey rover for real time centimeter level position solutions, and recorders at each of the primary reference station base station and the survey rover for recording data, the improvement comprising:

first means for detecting a loss of real time kinematic (RTK) initialization at the survey rover;

second means for detecting a loss of communication over the radio data link; and third means connected to each of the first and second means and for recording a file on the survey rover recorder that begins with a last valid initialization information that existed before a loss of either said RTK initialization or said communication over said radio data link, that records raw measurement information of the survey rover during either of said losses, and that ends by recording the survey rover RTK initialization information when both said RTK initialization and said communication over said radio data link are restored.

2. The system of claim 1, further comprising:

post processing means connected to each of said reference base station and survey rover recorders and for computing centimeter level positions of the survey rover for periods of loss of either said RTK initialization of the survey rover or periods of loss of said radio data link.

3. The system of claim 2, further comprising:

backward initialization propagation means connected to the post processing means for computing centimeter level positions from the raw measurements collected in said file between said beginning and ending from backward in time propagation of said RTK initialization information included at said file ending.

4. A survey system, comprising:

a survey rover, reference base station and radio data link that, at a time t0, provide for raw measurement information and differential correction data to begin to be communicated from said reference base station over a radio data link to said survey rover;

means providing, at a time t1 following said time t0, an initialization of said survey rover that provides for the real time survey position solutions;

means providing at a time t2 following said time t1, a communication of said last valid initialization information just before said radio data link is broken at a time t3 that follows said time t2;

means for anticipating said loss of communication by constantly recording said initialization information and raw measurements in a circular buffer that is transferred as a history to a recording at time t3, wherein real time survey position solutions are not available after time t3, and initialization may be quickly lost thereafter;

means providing at a time t4 that follows said time t3, a re-establishment of said radio data link and continuation of said recording until a time t5 that follows said time t4 wherein said survey rover reestablishes its initialization or restarts real-time positioning at said time t5; and means providing for copying said reestablished initialization information into said recording at time t5 and ending said recording;

wherein raw measurement information, including range, phase, cycle count and time measurements are recorded by said survey rover in said recording between said times t2 and t5.

5. A position domain method for recording raw measurement information from a survey rover having an unreliable radio data link to a reference base station, the method comprising:

at a time t0, said survey rover, reference base station and radio data link are placed in operation, providing for raw measurement information and differential correction data to begin to be communicated from said reference base station over said radio data link to said survey rover;

at a time t1 following said time t0, initializing said survey rover that provides for the real time survey position solutions;

at a time t2 following said time t1, communicating said last valid initialization information just before said radio data link is broken at a time t3 that follows said time t2;

anticipating said loss of communication by constantly recording said initialization information, position information and raw measurements in a circular buffer that is transferred as a history to a recording at time t3, wherein real time survey position solutions are not available after time t3, and initialization may be quickly lost thereafter;

at a time t4 that follows said time t3, reestablishing said radio data link and continuing said recording until a time t5 that follows said time t4 wherein said survey rover reestablishes its initialization or restarts real-time positioning at said time t5; and copying said reestablished initialization information into said recording at time t5 and ending said recording;

wherein raw measurement information, including range, phase, cycle count and time measurements are recorded by said survey rover in said recording between said times t2 and t5.

6. A measurement domain method for initializing a post-processor of a survey system that collects survey information from a GPS-based reference station in communication with a GPS-based rover, wherein the communication between the reference station and the rover is subject to interruption, the method comprising the steps of:

checking the condition of a communication channel between a survey reference station and a survey rover;

if said communication channel is interrupted, beginning the recording of GPS data and integer ambiguities from the position filter of a real-time position processor in said survey rover;

transferring said GPS data and integer ambiguities to a survey post-processor;

checking said GPS data and integer ambiguities for whether the associated GPS satellites have been continuously tracked and whether carrier cycle slips have occurred;

if said associated GPS satellites have been continuously tracked and no carrier cycle slips have occurred, marking said GPS data and integer ambiguities for said survey post-processor as valid for each associated GPS satellite;

checking to see if four or more satellites have thus been marked as providing valid data; and if four or more GPS satellites have been marked as providing valid data, then initializing said post-processor directly by starting with position filter states and covariance matrix supplied by said real-time processor in said CPS data and integer ambiguities.

7. A survey system, comprising:

a GPS-based survey rover for visiting a plurality of positions to be determined by a survey;

a GPS-based reference station at a known location;

a data communication link for providing raw measurement information and differential correction data from the reference station to the survey rover;

means for checking the condition of the data communication link;

means for beginning a recording of GPS data and integer ambiguities from a position filter of a real-time position processor in the survey rover if the data communication link is interrupted;

means for transferring said CPS data and integer ambiguities to a survey post-processor;

means for checking said CPS data and integer ambiguities for whether the associated CPS satellites have been continuously tracked and whether carrier cycle slips have occurred;

means for marking said GPS data and integer ambiguities for said survey post-processor as valid for each associated GPS satellite if said associated GPS satellites have been continuously tracked and no carrier cycle slips have occurred;

means for checking to see if four or more satellites have thus been marked as providing valid data; and means for initializing said post-processor directly by starting with a set of position filter states and a covariance matrix supplied by said real-time processor in said GPS data and integer ambiguities if four or more GPS satellites have been marked as providing valid data.

8. The system of claim 7, further including:

a rover to reference station communication link that provides for less than continuous data logging at said reference station.

9. A survey system, comprising:

a reference base station for receiving signals from a satellite navigation positioning system and providing for a calculation and output of a sequence of satellite navigation position measurement information;

a communication link for transmitting said satellite navigation measurement information from the reference base station;

a survey rover for receiving said satellite navigation measurement information over the communication link and for determining a series of centimeter-level accurate position solutions from said satellite navigation measurement information;

a detector associated with the survey rover responsive to a loss of communication over the communication link; and a recorder controlled by the detector to store a data record that begins with a last measurement data obtained during a last valid initialization that existed prior to any loss of reference-base-station to survey-rover communication and to also store a series of raw-measurement information of the survey rover;

wherein, when both the communication link and a real-time kinematic initialization are detected as having been restored, the recorder is switched from recording raw measurement information to record RTK initialization information in preparation for another interruption of the communication link.

10. The survey system of claim 9, further comprising:

a post processing system configured to compute centimeter level positions of the survey rover for periods of loss of either the RTK initialization or periods of loss of the communication link.

11. The survey system of claim 9, wherein:

the survey rover is further configured to detect a loss of real time kinematic (RTK) initialization at the survey rover, responsive to the loss of RTK initialization the survey rover recording data beginning with a last valid initialization information that existed prior to the loss of RTK initialization and additionally begins recording raw measurement information of the survey rover.

12. A measurement domain method for initializing a post-processor of a survey system that collects survey information from a GPS-based reference station in communication with a GPS-based rover, the method comprising the steps of:

checking the condition of a communication channel between a survey reference station and a survey rover;

recording GPS data and integer ambiguities from a position filter of a receiver in the survey rover if the communication channel is interrupted;

transferring the GPS data and the integer ambiguities to a survey post-processor; and initializing the post-processor directly by starting with position filter states and covariance matrix supplied by the receiver in the GPS data and the integer ambiguities if four or more GPS satellites associated with the GPS data and the integer ambiguities have been continuously tracked and no carrier cycle slips have occurred.

13. A survey system comprising:

a reference base station for receiving signals from a satellite navigation positioning system and providing for a calculation and output of a sequence of satellite navigation position measurement information;

a communication link for transmitting said satellite navigation measurement information from the reference base station;

a survey rover receiving the measurement information over the communication link and determining centimeter level position solutions a detector associated with the survey rover responsive to a real time kinematic (RTK) initialization at the survey rover; and a recorder controlled by the detector to store a data record that begins with a last measurement data obtained during a last valid initialization that existed prior to any loss of reference-base-station to survey-rover communication, wherein said data record includes a series of raw-measurement information of the survey rover;

wherein, when both the communication link and a real-time kinematic initialization are detected as having been restored, the recorder is switched from recording raw measurement information to record RTK initialization information in preparation for another interruption of the communication link.

14. The survey system of claim 13, wherein:

the survey rover is further configured to detect a loss of communication over the communication link and responsive to the loss of communication the survey rover recording data beginning with a last valid initialization information that existed prior to the loss of communication and additionally begins recording raw measurement information of the survey rover.

15. The survey system of claim 14, wherein:

when both the RTK initialization and the communication link are restored, the survey rover stops recording raw measurement information and records RTK initialization information.

16. The system of claim 15, further comprising:

a post processor configured to compute centimeter level positions of the survey rover for periods of loss of either the RTK initialization or periods of loss of the communication link.

17. The system of claim 16, further comprising:

a backward initialization propagator connected to the post processor for computing centimeter level positions from information recorded after the loss of either the communication link or of the RTK initialization.

18. A position domain method for recording raw measurement information from a survey rover, the method comprising:

a reference base station communicating raw measurement information and differential correction data over a radio data link to the survey rover;

initializing the survey rover that provides for the real time survey position solutions; recording initialization information, survey position solutions and raw measurement information in a buffer;

if the radio data link is broken, then transferring a last valid initialization information and the survey position solutions from the buffer to a file; and after the survey rover reestablishes its initialization or restarts real-time positioning, copying the reestablished initialization information into the file.

19. The method of claim 18, wherein:

the raw measurement information includes range, phase, cycle count and time measurements.

20. The method of claim 12, further including the steps of:

checking the GPS data and the integer ambiguities for whether the associated GPS satellites have been continuously tracked and whether carrier cycle slips have occurred;

if the associated GPS satellites have been continuously tracked and no carrier cycle slips have occurred, marking the GPS data and the integer ambiguities for the survey post-processor as valid for each associated GPS satellite; and checking to see if four or more satellites have been marked as providing valid data.

* * * * *